US012038039B2

(12) United States Patent
Parker et al.

(10) Patent No.: US 12,038,039 B2
(45) Date of Patent: Jul. 16, 2024

(54) SOCKET ASSEMBLY WITH A COATED WASHER

(71) Applicant: FEDERAL-MOGUL MOTORPARTS LLC, Southfield, MI (US)

(72) Inventors: Glen C. Parker, Saint Peters, MO (US); Thomas J. Byrnes, Jr., St. Charles, MO (US); Brennan J. Sugg, St. Louis, MO (US); Eric M. Kopsie, Bethalto, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 426 days.

(21) Appl. No.: 16/530,656

(22) Filed: Aug. 2, 2019

(65) Prior Publication Data

US 2020/0040937 A1    Feb. 6, 2020

Related U.S. Application Data

(60) Provisional application No. 62/713,588, filed on Aug. 2, 2018.

(51) Int. Cl.
*F16C 11/06*    (2006.01)
*B60G 7/00*    (2006.01)

(52) U.S. Cl.
CPC ...... *F16C 11/0642* (2013.01); *F16C 11/0652* (2013.01); *B60G 7/005* (2013.01);
(Continued)

(58) Field of Classification Search
CPC ............. F16C 11/0628; F16C 11/0633; F16C 11/0638; F16C 11/0642; F16C 11/0647;
(Continued)

(56) References Cited

U.S. PATENT DOCUMENTS 2,880,025 A * 3/1959 Herbenar ............ F16C 11/0604
403/133
3,999,872 A * 12/1976 Allison .................... B62D 7/16
403/135

(Continued)

OTHER PUBLICATIONS

"Disc Spring (Spring Washer) Corrosion Protection." Mubea Disc Springs. Jun. 21, 2016, [online], [retreived on Nov. 1, 2021] Retreived from the Internet <URL: http://web.archive.org/web/20160621062605/https://mubea-discsprings.com/materials/corrosion-protection/#>. (Year: 2016).*

(Continued)

*Primary Examiner* — Amber R Anderson
*Assistant Examiner* — Kevin J Baynes
(74) *Attorney, Agent, or Firm* — Robert L. Stearns; Dickinson Wright PLLC (57) ABSTRACT

A socket assembly includes a housing having an inner bore extending along a central axis between a closed first end and an open second end. At least one bearing is disposed in the inner bore, wherein the at least one bearing has a bearing surface and a support surface opposite the bearing surface. The socket assembly also includes a ball stud having a shank portion extending outwardly from the housing through the open second end and a ball portion disposed in the inner bore. At least one preload washer biases the at least one bearing into engagement with the ball portion of the ball stud. The at least one preload washer has an outer coating of a low friction, heat insulating material.

7 Claims, 9 Drawing Sheets

(52) U.S. Cl.
CPC . *B60G 2204/416* (2013.01); *Y10T 403/32762* (2015.01); *Y10T 403/32811* (2015.01)

(58) Field of Classification Search
CPC ......... F16C 11/0652; Y10T 403/32713; Y10T 403/32762; Y10T 403/32811; B60G 7/005; B60G 2204/416
See application file for complete search history.

(56) References Cited

U.S. PATENT DOCUMENTS

| | | | | |
|---|---|---|---|---|
| 4,035,094 | A * | 7/1977 | Herbenar | B62D 7/16 403/144 |
| 4,920,847 | A | 5/1990 | Conklin, Jr. | |
| 5,116,159 | A * | 5/1992 | Kern, Jr. | B62D 7/18 29/898.044 |
| 5,359,252 | A | 10/1994 | Swift et al. | |
| 5,464,296 | A * | 11/1995 | Broszat | F16C 11/0647 403/138 |
| 5,839,845 | A * | 11/1998 | Kincaid | F16C 11/0628 403/135 |
| 6,371,682 | B1 * | 4/2002 | Maughan | B62D 7/16 403/165 |
| 6,540,055 | B2 | 4/2003 | Eidam et al. | |
| 6,840,697 | B1 * | 1/2005 | Dorr | F16C 11/0638 403/133 |
| 7,644,500 | B2 * | 1/2010 | Schmidt | F16C 11/0685 29/898.044 |
| 7,766,252 | B2 | 8/2010 | Jackson et al. | |
| 7,854,425 | B2 | 12/2010 | Evans | |
| 8,047,739 | B2 * | 11/2011 | Sellers | F16C 11/069 403/135 |
| 8,366,082 | B2 | 2/2013 | Evans | |
| 8,714,862 | B2 * | 5/2014 | Mevorach | F16C 11/0642 403/144 |
| 9,765,811 | B2 * | 9/2017 | Karpman | F16C 11/0609 |
| 10,544,825 | B2 * | 1/2020 | Parker | F16C 11/0666 |
| 2009/0294138 | A1 | 12/2009 | Jackson et al. | |
| 2014/0205366 | A1 * | 7/2014 | Mevorach | F16C 11/0642 403/144 |
| 2016/0025129 | A1 * | 1/2016 | Parker | F16C 11/0671 403/134 |
| 2017/0268564 | A1 * | 9/2017 | Kopsie | F16C 11/0685 |
| 2017/0350441 | A1 * | 12/2017 | Parker, Jr. | F16C 11/0671 |
| 2019/0277334 | A1 * | 9/2019 | Sugg | F16C 11/0633 |
| 2019/0277335 | A1 * | 9/2019 | Sugg | F16C 11/0685 |

OTHER PUBLICATIONS

"Belleville Washers." Mubea Disc Springs. Jan. 6, 2016, [online], [retreived on Jan. 3, 2022] Retrieved from the Internet <URL:https://web.archive.org/web/20160621062532/http://mubea-discsprings.com/disc-springs/belleville-washers/#>. (Year: 2016).*

* cited by examiner

SOCKET ASSEMBLY WITH A COATED WASHER

CROSS-REFERENCE TO RELATED APPLICATION

This application claims the benefit of U.S. Provisional Application Ser. No. 62/713,588, filed Aug. 2, 2018, which is incorporated herein by reference in its entirety.

BACKGROUND

1. Field of the Invention

The present invention is related generally to socket assemblies and, more particularly, to socket assemblies of the type for use in vehicle suspension and steering assemblies.

2. Related Art

Socket assemblies of the type that are generally used in automobile suspension and steering systems often include a housing; a ball stud; one or more bearings; and a preloading washer, such as a Belleville washer. To meet certain automotive socket design requirements, the ball stud and bearings are often made of hardened materials. However, as these components wear against one another during the operating life, friction can be generated between the bearing and ball stud, and that friction can produce heat, which ultimately can cause the preload properties of the washer to diminish via altering of material properties of the washer, including causing the washer to take-on a heat-set, undesirably. In addition, the friction between the bearing and the ball stud and between the bearing and washer can prevent the bearing from aligning itself in assembly and during use, thereby diminishing the useful life of the socket assembly.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

It is an object of the present disclosure to provide a socket assembly having a preload washer that overcomes disadvantages of known socket assemblies.

It is a further object of the present disclosure to provide a method of constructing a socket assembly having a preload washer that overcomes disadvantages of known methods of constructing socket assemblies.

It is a further object of the present disclosure to provide a socket assembly that is economical in manufacture and assembly and that exhibits a long and useful life.

In accordance with these objectives, as well as others, which will be appreciated by those possessing ordinary skill in the art of socket assemblies, the present disclosure is directed to providing a socket assembly for motor vehicle and non-vehicle applications and to a method of construction thereof.

In accordance with one aspect, the present disclosure is directed to a socket assembly which advances the art and improves upon currently known socket assemblies for motor vehicles.

In another aspect, the present disclosure is directed to a method of construction of a socket assembly which advances the art and improves upon currently known methods of construction for socket assemblies for motor vehicles.

In accordance with these and other objects, advantages, and aspects, a socket assembly is provided including a housing having an inner bore which contains a ball portion of a ball stud; one or more bearings for low friction engagement with a ball portion of the ball stud; and a preload imparting washer. The preload washer is compressed to impart a biasing force on the one or more bearings to impart a desired preload within the socket assembly. The preload washer has an outer coating of a low friction, heat insulating material thereon to enhance the low friction operational performance and increase the longevity of useful life of the socket assembly.

In accordance with another aspect of the disclosure, the preload washer can be provided as a Belleville washer having the outer coating thereon.

The low friction aspect provided by the coating on the preload washer reduces the generation of heat within the socket assembly, thereby preventing grease from adversely decreasing in viscosity and escaping the housing, while also allowing the bearing engaging the preload washer to self-align within the inner bore, thereby allowing the bearing to attain an optimal functional position within the inner bore in optimally aligned relation with the ball portion of the ball stud. The heat reducing and heat insulating aspects of the coating also protect the preload washer from losing its "as manufactured" material properties, which if not prevented could cause the preload washer to lose its preloading capacity. As a result, the coating enhances functionality, increases durability and increases operating life of the socket assembly.

In accordance with another aspect of the disclosure, a socket assembly includes a housing having an inner bore extending along a central axis between a closed first end and an open second end. At least one bearing is disposed in the inner bore, wherein the at least one bearing has a bearing surface and a support surface opposite the bearing surface. The socket assembly also includes ball stud having a shank portion extending outwardly from the housing through the open second end and a ball portion disposed in the inner bore. Further yet, at least one preload washer biases the at least one bearing into engagement with the ball portion of the ball stud. The at least one preload washer has an outer coating of a low friction, heat insulating material.

In accordance with another aspect of the disclosure, the outer coating can engage the support surface of the at least one bearing to facilitate heat reduction and to facilitate self-aligning of the at least one bearing relative to the ball stud.

In accordance with another aspect of the disclosure, the at least one bearing can include a lower bearing captured between the ball portion of the ball stud and the closed first end of the housing, wherein the outer coating engages the support surface of the lower bearing.

In accordance with another aspect of the disclosure, the inner bore can be provided having a first diameter adjacent the closed first end and the lower bearing can be provided having an outer diameter that is less than the first diameter, wherein the outer coating facilitates radial movement the lower bearing to facilitate self-alignment of the lower bearing with the ball portion of the ball stud.

In accordance with another aspect of the disclosure, the outer coating can be provided to engage the closed first end of the housing, thereby further reducing the generation of heat due to friction.

In accordance with another aspect of the disclosure, the outer coating can be provided to encapsulate the preload washer, thereby maximizing protection to the preload washer against the effects of heat within the housing.

In accordance with another aspect of the disclosure, the preload washer can be provided as a Belleville washer.

In accordance with another aspect of the disclosure, the socket assembly can further include a dust boot having a flexible boot body extending between an upper end configured in sealed engagement about the shank portion of the ball stud and a lower end configured in sealed engagement with the open second end of said housing, wherein the at least one preload washer can be provided to engage the lower end of the dust boot.

In accordance with another aspect of the disclosure, the at least one bearing can include an upper bearing captured between the lower end of the dust boot and the ball portion of the ball stud.

In accordance with another aspect of the disclosure, the at least one preload washer can be bonded to the lower end of the dust boot, thereby simplifying handling during assembly.

In accordance with another aspect of the disclosure, the at least one preload washer can be overmolded with material of the dust boot, thereby simplifying manufacture and reduce the cost associated with manufacture and assembly.

In accordance with another aspect of the disclosure, the at least one preload washer can be encapsulated within the lower end of the dust boot.

In accordance with another aspect of the disclosure, the socket assembly can further include a dust boot having a flexible boot body extending between an upper end configured in sealed engagement about the shank portion of the ball stud and a lower end configured in sealed engagement with the open second end of the housing, wherein the at least one bearing can include an upper bearing captured between the lower end of the dust boot and the ball portion of the ball stud, wherein the at least one preload washer engages the lower end of the dust boot.

BRIEF DESCRIPTION OF THE DRAWINGS

These and other features and advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

Figure 1:
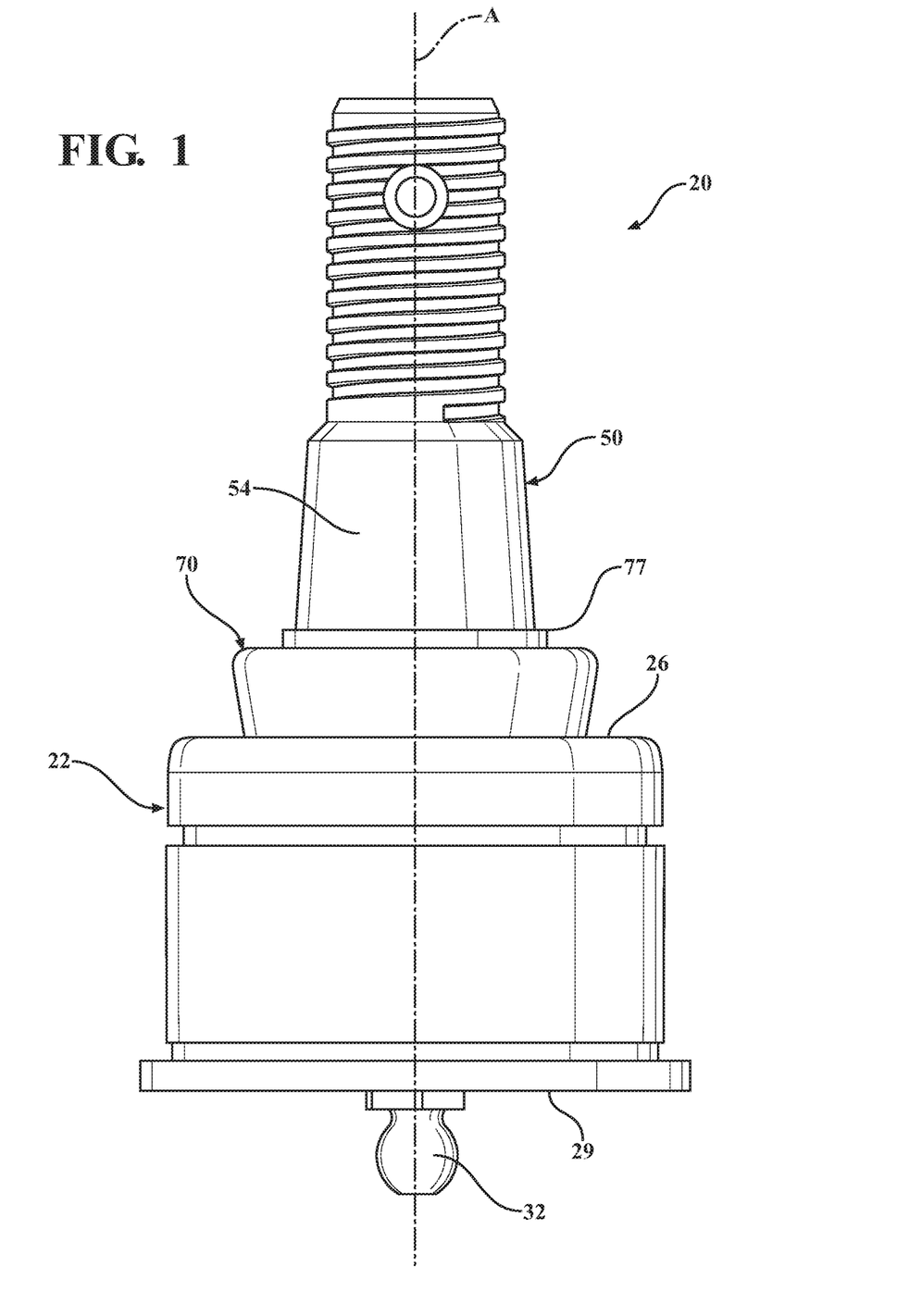
FIG. 1 is a front elevation view of a first exemplary embodiment of a socket assembly constructed according to one aspect of the present invention.

Referring to FIG. 1, wherein like numerals indicate corresponding parts throughout the several views, an exemplary embodiment of an improved socket assembly 20 (specifically, a ball joint socket assembly), is generally shown. In the exemplary embodiment, the socket assembly 20 is configured for joining a control arm (not shown) with a knuckle (not shown) of a vehicle suspension assembly. However, it should be appreciated that the socket assembly 20 could find uses in tie rod ends or in a wide range of automotive and non-automotive applications.

The socket assembly 20 includes a housing 22 with an inner bore that extends along an axis A from a closed or substantially closed first end 24 to an open second end 26. At the first end 24, the housing 22 presents a lower wall 28 with an inner surface 27 and an exterior surface 29. The housing 22 is preferably made of a metal, such as steel or an alloy steel, and may be shaped through any suitable process or combination of processes including, for example, forging, casting, machining from a billet, etc. In the exemplary embodiment, the housing 22 is a cartridge for press-fitting into an opening of the control arm. However, the housing could alternately be integrally formed with another component, e.g., a control arm or a tie rod end, or otherwise configured for attachment to a support member, such as via external or internal threads. In the exemplary embodiment, the lower wall 28 of the housing presents a lubricant opening 30 which receives a grease fitting 32 to convey a lubricant into a first portion 34 of the inner bore to initially lubricate the socket assembly 20 and to re-lubricate the socket assembly 20 as part of routine maintenance. It is to be appreciated that the lubricant opening 30 does not have to be on the lower wall 28, but could instead be located on any suitable portion of the housing 22.

The inner bore of the housing 22, by way of example and without limitation, has a progressively increasing diameter from the first end 24 to the second end 26. Specifically, the inner bore has the first portion 34 with a first diameter $D_1$ adjacent the closed first end 24 and shown as extending from the close first end 24, a second portion 36, a third portion 38 with a second diameter $D_2$ that is larger than the first diameter $D_1$ and a fourth portion 39 adjacent the open second end 26 with a third diameter $D_3$ that is greater than the second diameter $D_2$. Between the second and third portions 36, 38, the housing 22 presents a first shoulder 40 which faces toward the open second end 26. Between the third and fourth portions 38, 39, the housing 22 presents a second shoulder 41 which also faces toward the open second end 26. It is to be recognized the inner bore could be otherwise configured, such as being cylindrical, by way of example and without limitation.

Figure 6:
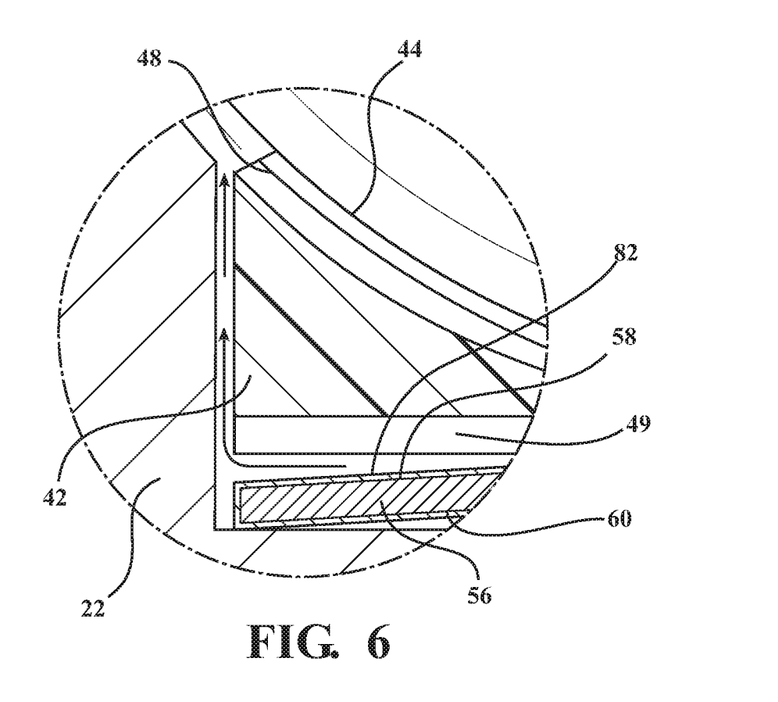
FIG. 6 is an enlarged view of a portion of FIG. 5.

A lower bearing, also referred to as backing bearing 42, is received in the first portion 34 of the inner bore and is captured between the ball portion 52 of the ball stud 50 and the closed first end 24. The backing bearing 42 has a semi-spherically curved first bearing surface 44 which faces axially toward the second open end 26 and an opposite support surface 45 which faces axially toward the closed first end 24. The backing bearing 42 has an outer diameter which is less than the first diameter $D_1$ of the first portion 34 of the inner bore. As such, the backing bearing 42 is desirably movable within the first portion 34 of the inner bore in a radial direction relative to the housing 22 to allow the backing bearing 42 to float radially within the first portion 34 of the inner bore to in effect, self-align itself radially relative to the ball stud 50 and the ball portion 52 thereof, thereby being able to attain low friction, uniformly nested sliding contact with the ball portion 52. The first bearing surface 44 of the exemplary embodiment is provided with a plurality of first grooves 48 (FIGS. 6 and 8) formed thereon for conveying a lubricant from the lubricant opening 30 into the second portion 36 of the inner bore. The lower support surface 45 of the backing bearing 42 also presents a plurality of second grooves 49 (FIGS. 4 and 8) for channeling the lubricant between the backing bearing 42 and the lower wall 28 to reduce friction between the backing bearing 42 and the lower wall 28 and facilitate the radial movement of the backing bearing 42 within the first portion 34 of the inner bore.

The socket assembly 20 further includes a ball stud 50 which is partially received in the inner bore of the housing 22. Specifically, the ball stud 50 includes a ball portion 52 that is fully disposed in the inner bore and a shank portion 54 which projects out of the inner bore through the open second end 26. The exemplary embodiment of the shank portion 54 extends from the ball portion 52 to a distal end which is threaded for receiving a nut to connect the shank portion 52 with another component, e.g., a knuckle. Alternately, the shank portion 54 could be configured for connection with the other component through any suitable means. The ball portion 52 of the ball stud 50 has a generally semi-spherically curved outer surface which has a similar radius of curvature to the first bearing surface 44 of the backing bearing 42. The outer surface of the ball portion 52 is in sliding contact with the first bearing surface 44 of the backing bearing 42 for allowing the ball stud 50 to rotate or pivot relative to the backing bearing 42 and the housing 22 during operation of the suspension assembly. With the backing bearing 42 being able to self-align, the first bearing surface 44 is able to automatically self-locate in optimally aligned relation for low friction, uniform contact with ball portion 52. The backing bearing 42 is preferably made of metal, such as steel or a steel alloy and may be shaped through any suitable process.

Figure 4:
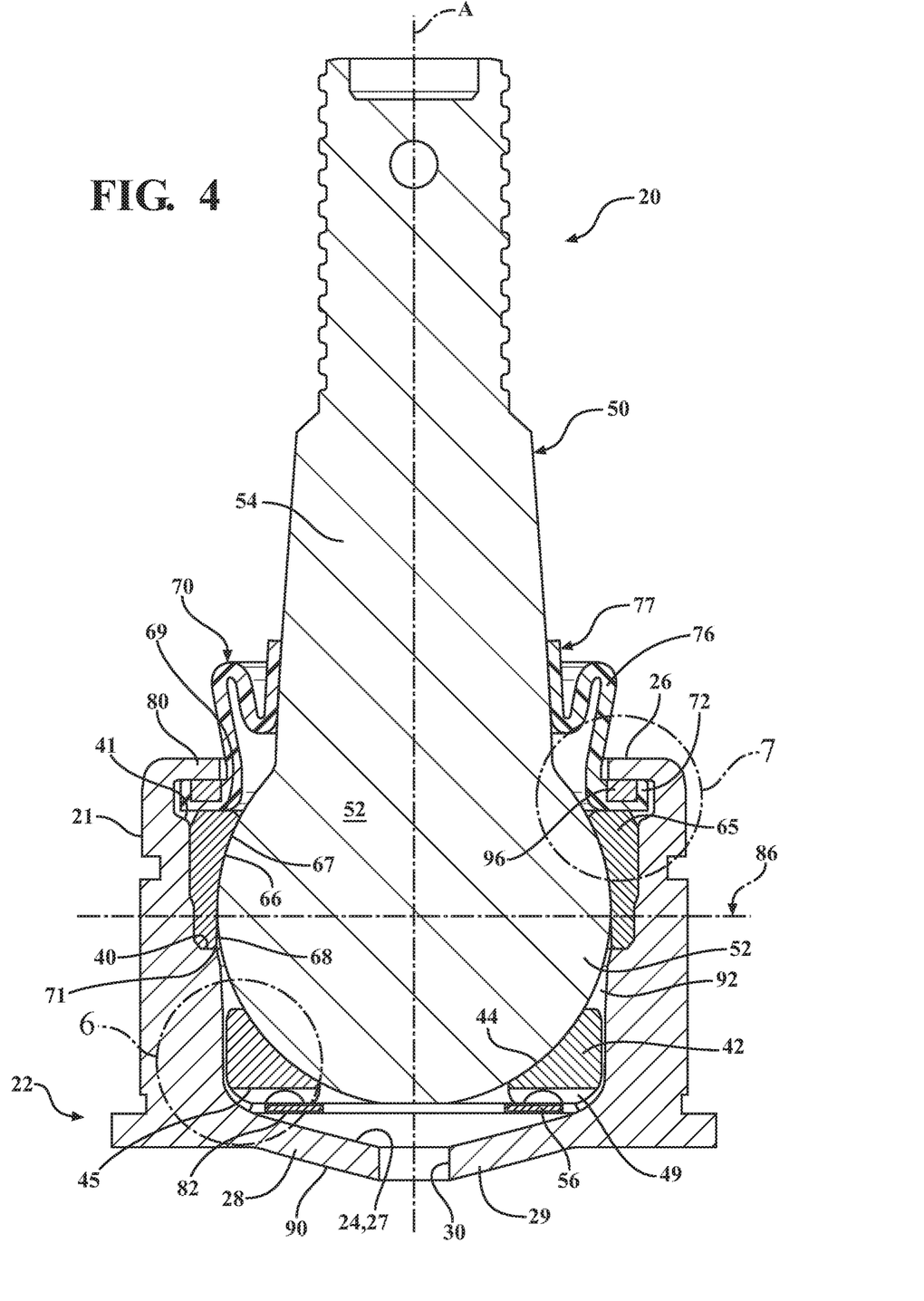
FIG. 4 is a cross-sectional view of the socket assembly of FIG. 1 in a pre-deforming state.

An upper bearing, also referred to as exit bearing 65, is received in the second portion 36 of the inner bore and has a second bearing surface 66 which is in sliding contact with the ball portion 52 of the ball stud 50. The second bearing surface 66, by way of example and without limitation, includes a semi-spherically curved portion 67 and a cylindrical portion 68. The semi-spherically curved portion 67 has a similar or same radius of curvature as the ball portion 52 and the first bearing surface 44 and is in sliding contact an opposite hemisphere of the ball portion 52 from the first bearing surface 44. The cylindrical portion 68 of the second bearing surface 66 extends past (i.e., below) and is in sliding contact with an equator, or center-line 86, of the ball portion 52 and has a generally constant diameter as viewed in cross-section for a predetermined length. Similar to the first bearing surface 44, the second bearing surface 66 may include one or more grooves for distributing a lubricant around the surface-to-surface contact between the second bearing surface 66 and the ball portion 52 of the ball stud 50 and for conveying the lubricant in the inner bore axially across the exit bearing 65. As shown in FIG. 4, a gap 92 between the backing bearing 42 and the exit bearing 65 functions as a lubrication reservoir which holds the lubricant. The semi-spherically curved portion 67 of the second bearing surface 66 captures the outer surface of the ball portion 52 of the ball stud 50 to limit axial movement of the ball stud 50 in an axial direction towards the open first end 26 of the housing 22. The cylindrical portion 68 of the second bearing surface 66 limits radial movement of the ball stud 50 relative to the housing 22 and transmits radial forces from the ball stud 50 to the housing 22. During operation of the vehicle, the semi-spherically curved portion 67 of the second bearing surface 66 of the exit bearing 65 and the first bearing surface 44 of the backing bearing 42 transfer all or substantially all of the axial forces between the ball stud 50 and the housing 22, and the cylindrical portion 68 of the second bearing surface 66 of the exit bearing 65 transfers all or substantially all of the radial forces between the ball stud 50 and the housing 22.

The exit bearing 65 has a generally flat, planar upper surface 69 which faces toward the open second end 26 of the housing 22. Opposite of the upper surface 69, the exit bearing 65 has a lower surface 71 which is seated against the shoulder 40 of the housing 22 to establish a fixed distance between the lower wall 28 of the housing 22 and the exit bearing 65.

Figure 5:
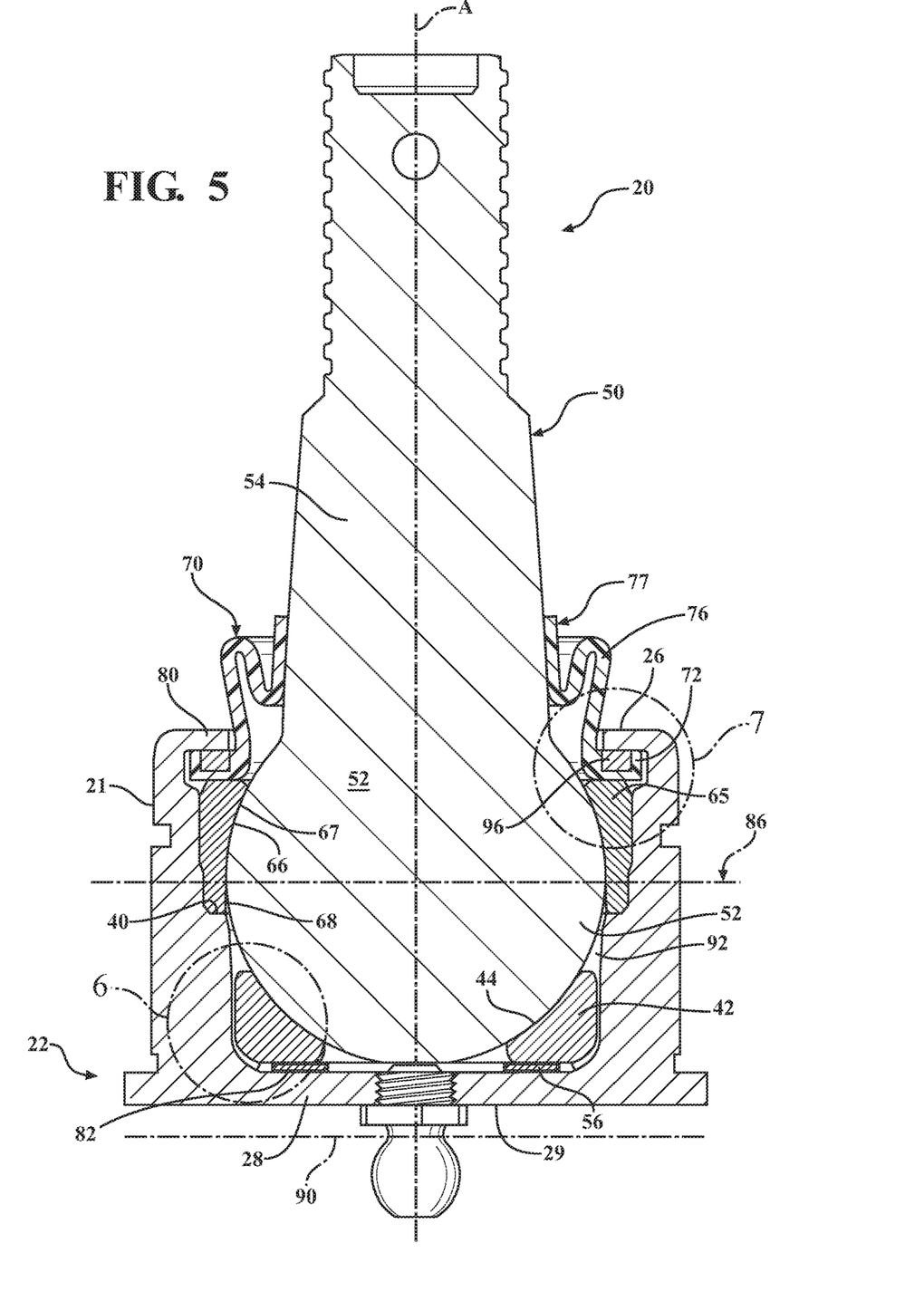
FIG. 5 is a cross-sectional view of the socket assembly of FIG. 1 in after final assembly.
Figure 7:
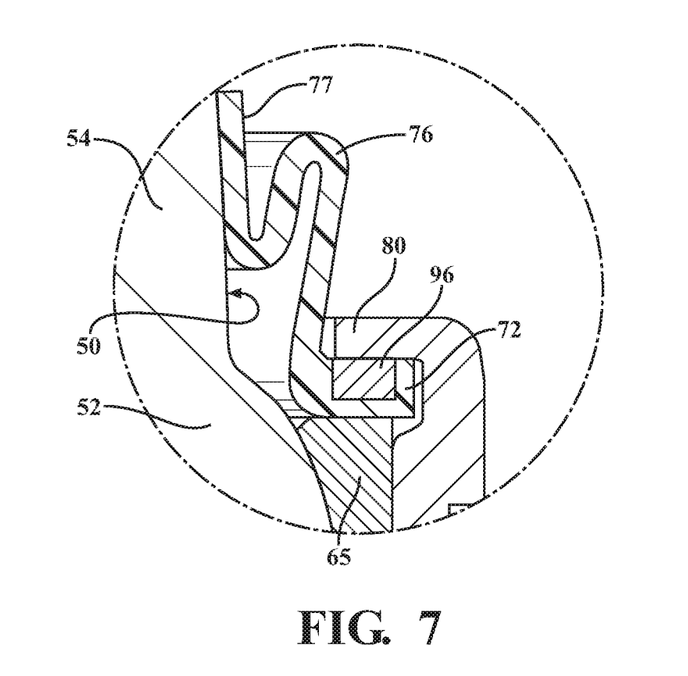
FIG. 7 is an enlarged view of another portion of FIG. 5.

The socket assembly 20 further includes a dust boot 70 which is sealed against the housing 22 and against the ball stud 50 for trapping a lubricant, such as grease, in an interior of the socket assembly 20 and for keeping contaminants outside of the interior of the socket assembly 20. The dust boot 70 includes a boot body 76 which is made of a flexible sealing material, such as rubber or certain plastics. In the embodiment of FIGS. 4, 5 and 7, a lower end forming a radially outwardly extending flange 72 is positioned in the fourth portion 39 of the inner bore of the housing 22. The radially outwardly extending flange 72 is in surface-to-surface contact with the upper surface 69 of the exit bearing 65. The radially outwardly extending flange 72 is also sealed against a radially inwardly extending lip 80 which is formed into the open second end 26 of the housing 22. The dust boot 70 also has an upper end 77 which is sealed against the shank portion 54 of the ball stud 50. The radially inwardly extending lip 80 is preferably formed into the housing 22 by spinning, or swaging, the open second end 26 of the housing 22 inwardly to trap the radially outwardly extending flange 72 of the dust boot 70 and to hold the exit bearing 65 in the position between the radially outwardly extending flange 72 of the dust boot 70 and the shoulder 40 of the housing 22. Also in this non-limiting embodiment, a rigid and non-flexible insert 96 is at least partially embedded within the radially outwardly extending flange 72 of the boot body 76.

A preload washer 56, (also known as a washer spring), such as a Belleville spring washer, by way of example and without limitation, is positioned in the first portion 34 of the inner bore of the housing 22 and imparts a preload or biasing force on the backing bearing 42, such that backing bearing 42 is preloaded and biased toward the open second end 26 against the ball portion 52 of the ball stud 50 to maintain desired uniform, surface-to-surface contact between the first and second bearing surfaces 44, 66 and the outer surface of the ball portion 52, even as these surfaces wear during operation of the socket assembly 20. It should be appreciated that another type of compression spring, other than a Belleville washer, could alternately be employed.

Figure 2:
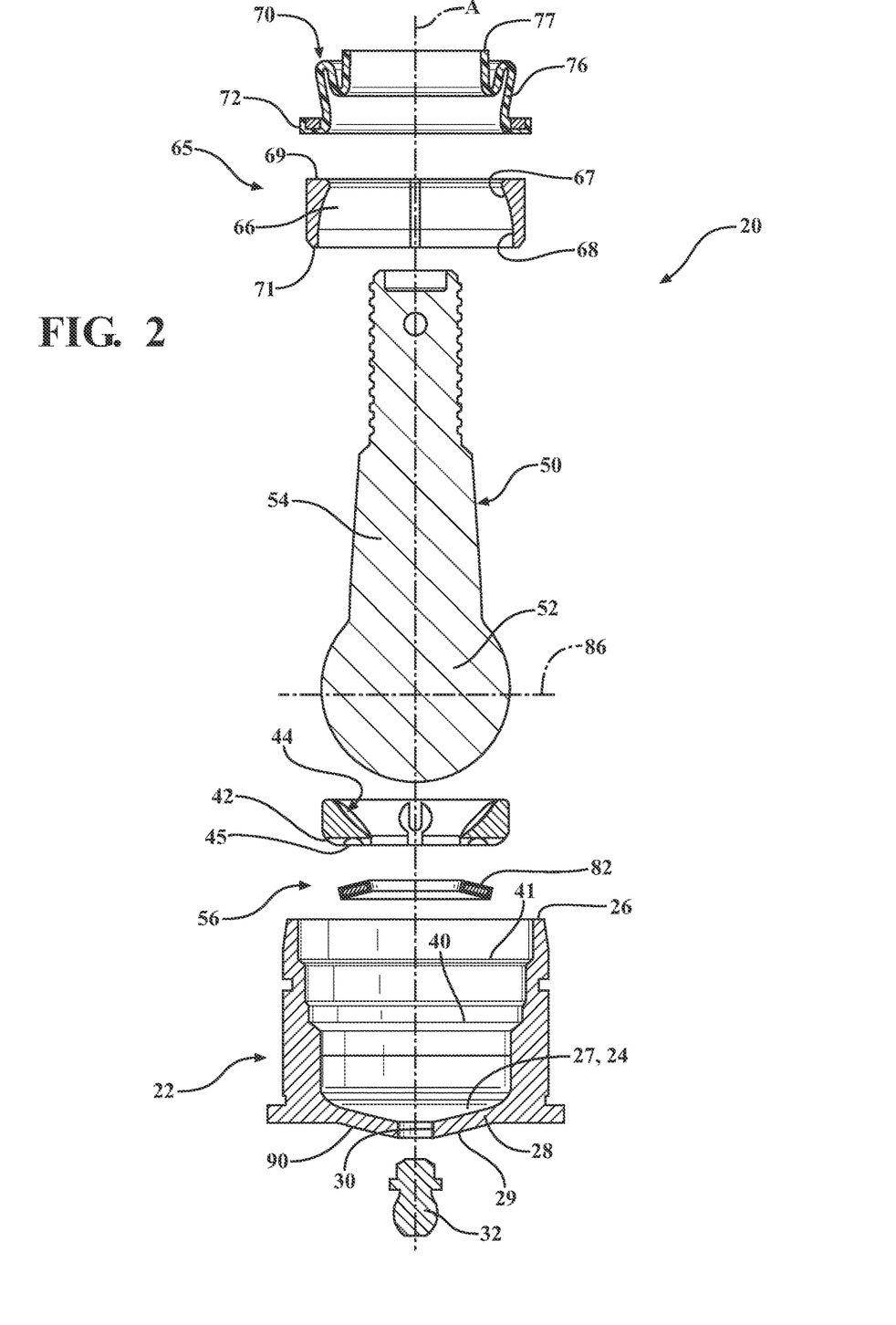
FIG. 2 is an exploded and sectional view of the socket assembly of FIG. 1.
Figure 3:
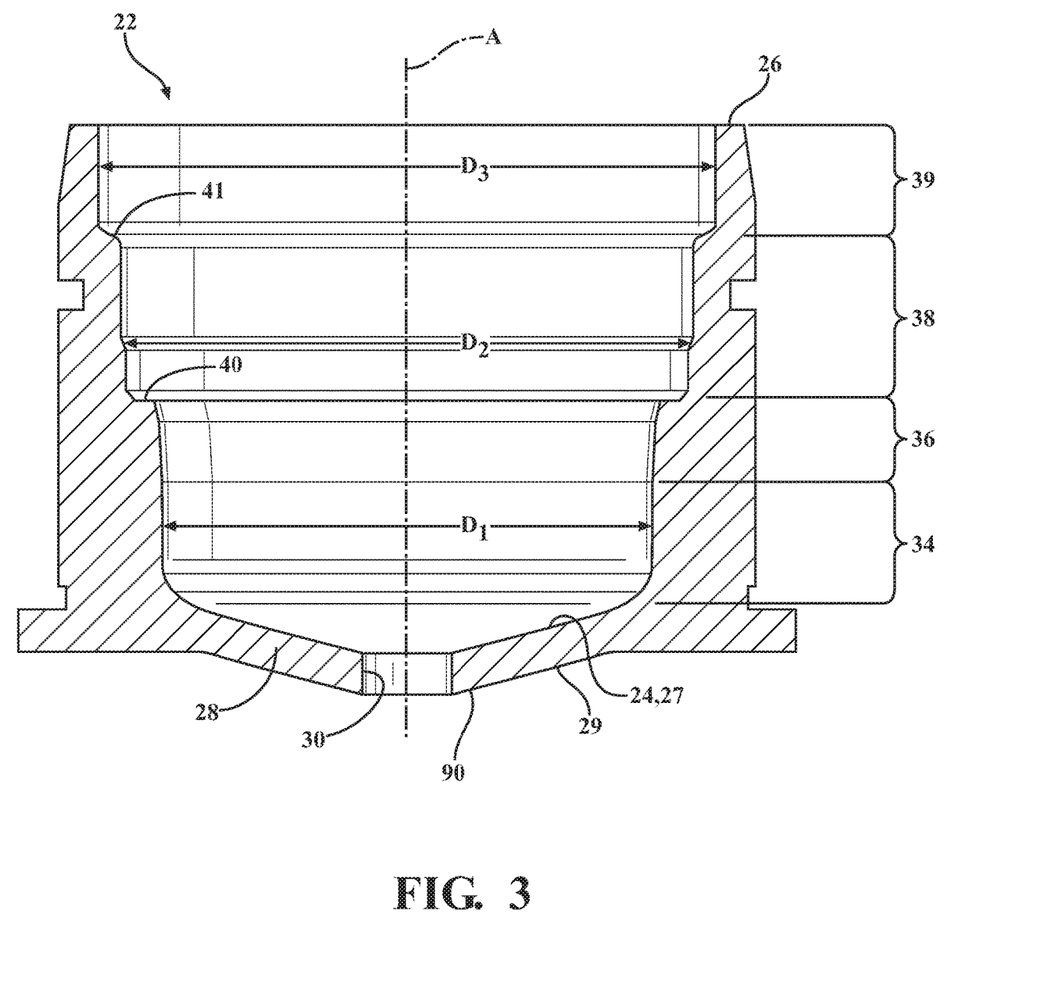
FIG. 3 is a cross-sectional view of a housing of the socket assembly of FIG. 1.

As shown in FIGS. 2-4, the lower wall 28 of the housing 22 is preformed with a conically shaped projection 90 which surrounds the lubricant opening 30 and which projects axially away from the closed first end 24 of the inner bore. In reference to FIG. 5, during manufacture of the socket assembly 20, after the open second end 26 of the housing 22 is swaged, the conically shaped projection 90 is pressed to deform the lower wall 28 such that its exterior surface 29 and its interior surface 27 are generally planar or flat in final form (FIG. 5). The flatting of the lower wall 28 further biases the first bearing surface 44 of the backing bearing 42 against the outer surface of the ball portion 52 of the ball stud 50, via the preload force imparted by preload washer 56. By way of this pressing operation, all of the clearances between the components in the inner bore of the housing 22 are reduced, and thus, the swaging operation does not affect any clearances between the components of the socket assembly 20.

As shown in FIG. 2, in this exemplary embodiment, the preload washer (Belleville spring washer) 56 is oriented with a concave side facing downward toward the closed first end 24 of the inner bore of the housing 22. The Belleville spring washer 56 is stressed elastically when the exit bearing 65 is pressed into the third portion 38 of the inner bore and is seated against the shoulder 40, which further biases the ball portion 52 of the ball stud 50 against the backing bearing 42, which is further biased against the Belleville spring washer 56 to force the Belleville spring washer 56 into a compressed, stressed, resiliently deformed condition against the lower wall 28 of the housing 22. Alternately, if the Belleville spring washer 56 is placed in the inner bore with the concave side facing towards the open second end 26 of the inner bore, this allows the Belleville spring washer 56 to remain in an unstressed condition until the lower wall 28 is pressed flat (see FIG. 5), thereby preloading the backing bearing 42 against the ball portion 52 of the ball stud 50. Accordingly, the preload washer 56 biases the backing bearing 42 and exit bearing 65 into engagement with said ball portion 52 of the ball stud 50.

Figure 12:
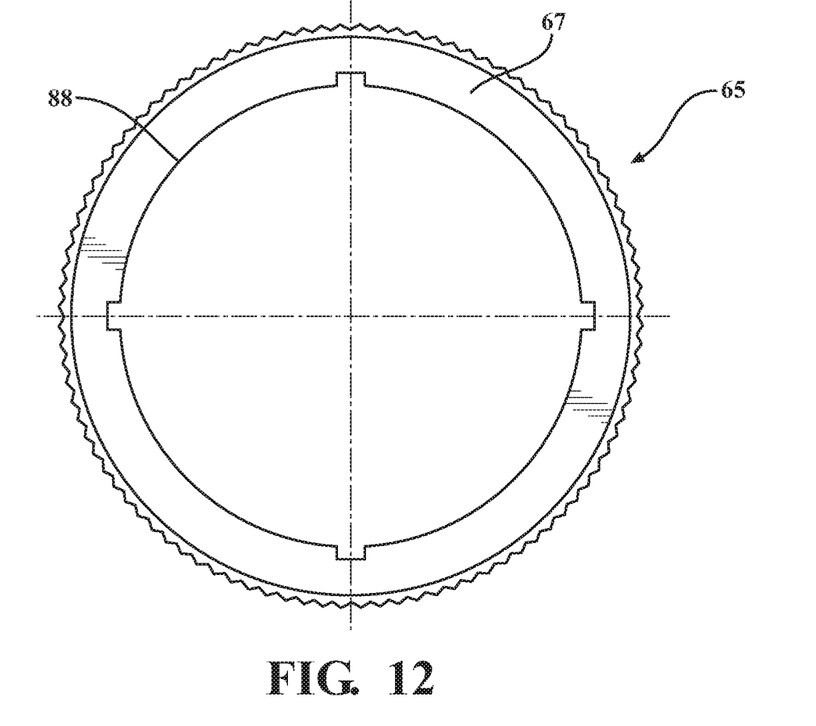
FIG. 12 is a top view of the exit bearing of FIG. 11.

Referring now to FIGS. 3, 4, 11 and 12, the exit bearing 65 has a cylindrically shaped outer surface which has an outer diameter that is larger than the second diameter $D_2$ of the third portion 38 of the inner bore to facilitate an interference fit between the exit bearing 65 and the housing 22. The outer surface is also provided with a plurality of axially extending knurls 85 (FIG. 11), or ridges, which are spaced circumferentially from one another for restricting rotation of the exit bearing 65 relative to the housing 22. As shown in FIG. 12, an opening 88 at the top of the exit bearing 65 is generally circular for allowing the ball stud 50 to freely pivot relative to the housing 22 and the exit bearing 65 in any direction.

Figure 8:
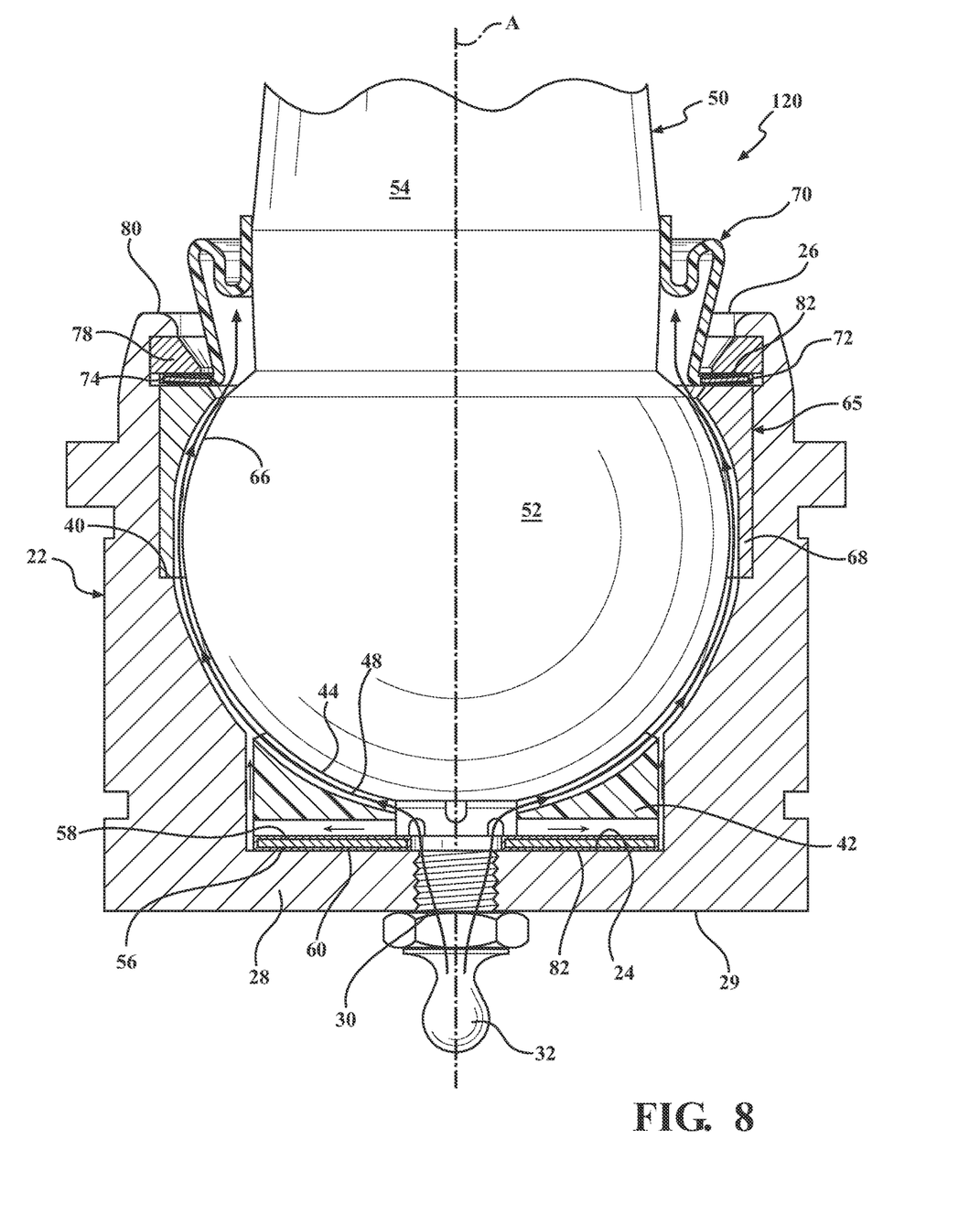
FIG. 8 is a cross-sectional and fragmentary view of a second exemplary embodiment of the socket assembly.
Figure 9:
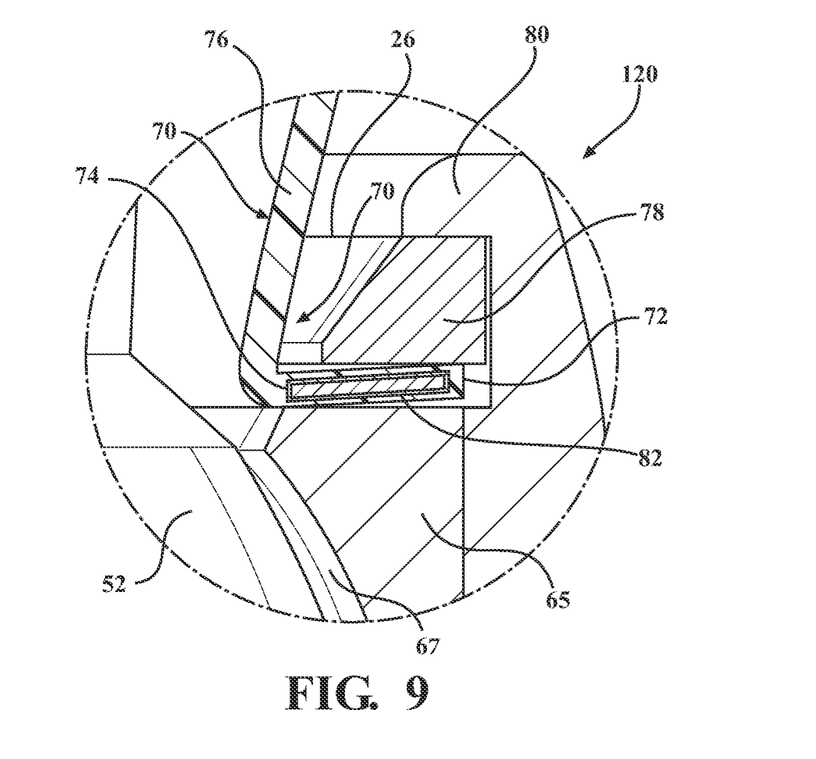
FIG. 9 is an enlarged view of a portion of FIG. 8.

Referring now to FIGS. 8 and 9, another exemplary embodiment of the socket assembly 120 is generally shown. The second exemplary embodiment is distinguished from the first exemplary embodiment by the radially outwardly extending flange 72 of the lower end on the boot body 76 of dust boot 70 including a preload washer, again shown as a Belleville spring washer 74, by way of example and without limitation, fixed thereto rather than a rigid and non-flexible insert. The Belleville spring washer 74 applies a biasing force to urge the exit bearing 65 against the ball portion 52 of the ball stud 50, wherein the exit bearing 65 is captured between the flange 72 of the lower end of the dust boot 70 and the ball portion 52 of the ball stud 50, wherein the preload washer 74 engages the flange 72 of the lower end of the dust boot 70. Also provided is a cover plate 78 which is positioned between the radially inwardly extending lip 80 of the housing 22 and the radially outwardly extending flange 72 of the boot body 76. As such, the preload washer 74 is sandwiched between the cover plate 78 and the exit bearing 65. In the embodiment illustrated, the preload washer 74 is fixed to the lower end of the dust boot 70 in a molding process, such that as least a portion of the preload washer 74 is bonded directly to the lower end of the boot body 76 via molding, and can be overmolded and fully embedded within and encapsulated by the lower end flange 72 of the boot body 76.

Figure 10:
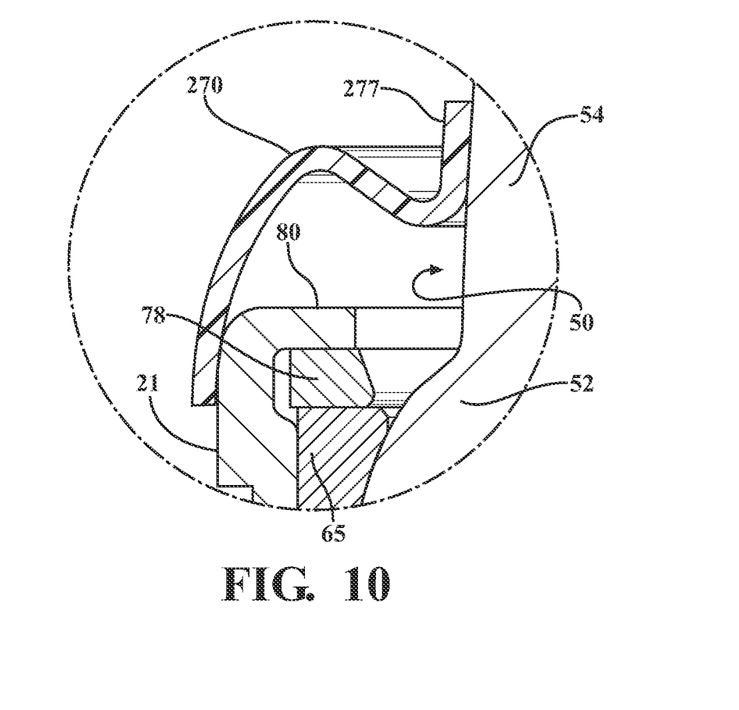
FIG. 10 is a cross-sectional and fragmentary view of a portion of a third exemplary embodiment of the socket assembly.
Figure 11:
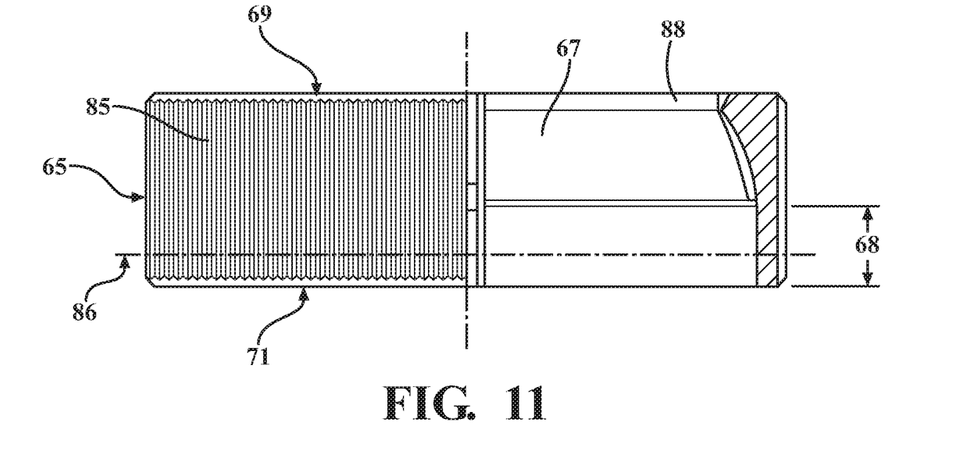
FIG. 11 is a front and partially sectioned view of a first exemplary embodiment of an exit bearing.

Referring now to FIG. 10, yet another exemplary embodiment of the socket assembly 220 is generally shown with like numerals, separated by a prefix of "2" indicating corresponding parts with the above-described embodiments. In this exemplary embodiment, the dust boot 270 is sealed against an outer surface 21 of the housing 22 rather than an inner surface as is the case in the other embodiments.

In each of the exemplary embodiments, the Belleville spring washer 56, 74 is covered on its upper and lower wear surfaces 58, 60, and is preferably fully encapsulated by an outer coating 82 that is made of a material which has low coefficient of friction and has high heat insulating properties. The coating 82 is preferably a film lubricant or a plastic material and may be applied to the Belleville spring washer 56, 74 through any suitable process, e.g., spraying, painting, plating, etc. The low coefficient of friction of the material that the coating 82 can be configured to engage one or more of the support surface 45, 69 of the respective bearings 42, 65 to reduce the amount of friction between abutting surfaces of the respective preload washer(s) 56, 74 and bearing(s) 42, 65, and thus, the amount of heat that may be generated due to relative movement between the Belleville spring washer 56, 74 and any bearing 42, 65 or other surface that contacts the Belleville spring washer 56, 74, such as the inner surface 27 of closed first end 24, is reduced. This reduction in heat generation prevents the viscosity of the grease contained in the socket assembly 20, 120 from decreasing, thereby inhibiting the grease from escaping the socket assembly 20, 120. The heat insulating properties of the coating 82 also protect against the material properties of the metal of the Belleville spring washer 56, 74 from changing, such as from preventing the preload washer 56, 74 from taking on a heat set or being tempered, for example, which could otherwise reduce the preload force applied by the Belleville spring washer 56, 74 on an adjacent bearing 42, 65, and ultimately reduce the operating performance of the socket assembly 20, 120. Further yet, as discussed above, the backing bearing 42 is desirably movable radially within the first portion 34 of the inner bore relative to the housing 22 to allow the backing bearing 42 to float radially and self-align itself radially relative to the ball stud 50 and the ball portion 52 thereof. The coating 82 facilitates radial movement of the lower bearing 42 to facilitate self-alignment of the lower bearing 42 with the ball portion 52, thereby allowing the lower bearing 42 to readily attain low friction, uniformly engaged sliding contact with the ball portion 52.

Another aspect of the present disclosure is for a method of making a socket assembly 20. The method includes the step of preparing a housing 22 with an inner bore which extends from a lower wall 28 at a generally closed first end 24 to an open second end 26. The lower wall 28 has an exterior surface with a conically shaped projection 90 that projects in an axial direction away from the second open end 26. The method continues with the step of inserting a preload washer, such as a Belleville spring washer 56, into the inner bore of the housing 22. The method proceeds with the step of inserting a backing bearing 42 with a first bearing surface 44 into the inner bore of the housing 22 such that the backing bearing 42 is movable in a radial direction relative to the housing 22 within the inner bore. The method continues with the step of inserting a ball portion 52 of a ball stud 50 into the inner bore of the housing 22 such that a shank portion 54 of the ball stud 50 extends from the ball portion 52 out of the inner bore through the open second end 26 of the housing 22. The method proceeds with the step of fixing an exit bearing 65 with a second bearing surface 66 into a fixed position within the inner bore of the housing 22. In the exemplary method, the exit bearing 65 is fixed between a shoulder 40 of the housing 22 and a radially extending lip 80 that is formed by swaging the open second end 26 of the housing 22. The method continues with the step of deforming the lower wall 28 at the generally closed first end 24 of the housing 22 to preload the Belleville washer 56 against the backing bearing 42 and urge the first bearing surface 44 of the backing bearing 42 against an outer surface of the ball portion 52 of the ball stud 50. In the exemplary method, the step of deforming is further defined as pressing the projection 90 until the exterior surface of the wall is generally flat. The lower wall 28 could be pressed, for example, with a ram.

It should be appreciated that the use of the orientation defining terms such as "upper" and "lower" herein is in reference to the orientation of the socket assembly 20 in the Figures and is not considered to require a particular orientation or otherwise be limiting.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A socket assembly, comprising:
    a housing having an inner bore extending along a central axis between a closed first end of said housing and an open second end of said housing;
    a lower bearing disposed in said inner bore of said housing, said lower bearing having a bearing surface and a planar support surface opposite said bearing surface;
    a ball stud having a shank portion extending outwardly from said housing through said open second end and a ball portion disposed in said inner bore;
    a preload washer biasing said lower bearing into engagement with said ball portion of said ball stud, said preload washer being made of a metal that has a heat setting temperature and having an outer coating of a heat insulating material which allows the preload washer to operate in an environment above the heat setting temperature without the preload washer taking a heat set;
    said outer coating of said preload washer engaging said planar support surface of said lower bearing; and
    said lower bearing being able to float radially within said inner bore relative to the housing and to said preload washer by sliding said planar support surface along said preload washer.

2. The socket assembly of Claim 1, wherein said lower bearing is captured between said ball portion of said ball stud and said closed first end of said housing.

3. The socket assembly of claim 2, wherein said outer coating engages said closed first end of said housing.

4. The socket assembly of claim 3, wherein said outer coating encapsulates said preload washer.

5. The socket assembly of claim 2, further including a dust boot having a flexible boot body extending between an upper end configured in sealed engagement about the shank portion of the ball stud and a lower end configured in sealed engagement with said open second end of said housing, wherein a second preload washer engages said lower end of said dust boot.

6. The socket assembly of claim 1, wherein said preload washer is a Belleville washer.

7. The socket assembly as set forth in claim 1 wherein the closed first end of said housing includes a lower wall that is pre-formed with a conical shape and that is flattened to compress the preload washer.

* * * * *